US009319579B2

(12) United States Patent
Kagaya

(10) Patent No.: US 9,319,579 B2
(45) Date of Patent: Apr. 19, 2016

(54) IMAGE PROCESSING APPARATUS, CONTROL METHOD, AND PROGRAM FOR THE SAME WITH FOCUS STATE SPECIFICATION AND DELETION CONFIRMATION OF IMAGE DATA

(71) Applicant: CANON KABUSHIKI KAISHA, Tokyo (JP)

(72) Inventor: Sosuke Kagaya, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 13/930,346

(22) Filed: Jun. 28, 2013

(65) Prior Publication Data
US 2014/0009659 A1 Jan. 9, 2014

(30) Foreign Application Priority Data

Jul. 5, 2012 (JP) .................................. 2012-151825
Jun. 4, 2013 (JP) .................................. 2013-117848

(51) Int. Cl.
*H04N 5/232* (2006.01)
(52) U.S. Cl.
CPC ....... *H04N 5/23212* (2013.01); *H04N 5/23293* (2013.01)
(58) Field of Classification Search
None
See application file for complete search history.

(56) References Cited

U.S. PATENT DOCUMENTS

| 8,363,092 | B2 | 1/2013 | Okamoto |
| 2006/0164535 | A1* | 7/2006 | Oyama .................... 348/333.01 |
| 2007/0132874 | A1* | 6/2007 | Forman et al. ........... 348/333.02 |
| 2008/0278618 | A1* | 11/2008 | Matsumoto et al. .......... 348/345 |
| 2011/0273471 | A1* | 11/2011 | Nagasaka et al. ............ 345/619 |
| 2012/0274812 | A1* | 11/2012 | Gyotoku et al. ............... 348/239 |
| 2013/0194215 | A1* | 8/2013 | Toida et al. .................... 345/173 |
| 2014/0184848 | A1* | 7/2014 | Shimosato ................ 348/223.1 |

FOREIGN PATENT DOCUMENTS

| JP | 2008-289065 A | 11/2008 |
| JP | 2009-159357 A | 7/2009 |

* cited by examiner

*Primary Examiner* — Shahbaz Nazrul
(74) *Attorney, Agent, or Firm* — Fitzpatrick, Cella, Harper & Scinto

(57) ABSTRACT

An image processing apparatus generates an image data in which a focus state of a captured image is specified by calculation processing. An operation inputting unit is used for operating focus information for specifying the focus state of an image, and an image generating unit generates an image data by acquiring focus information. When image focus information is changed by specification made by a user, the image generating unit outputs the image data generated by using focus information prior to specification to a confirmation screen generating unit upon deletion operation of the image data. The confirmation screen generation unit generates a display data of a deletion confirmation screen for prompting a user to confirm deletion upon deletion operation of an image file. The display data of a deletion confirmation screen includes the image data generated by using focus information differing from the changed focus state.

17 Claims, 16 Drawing Sheets

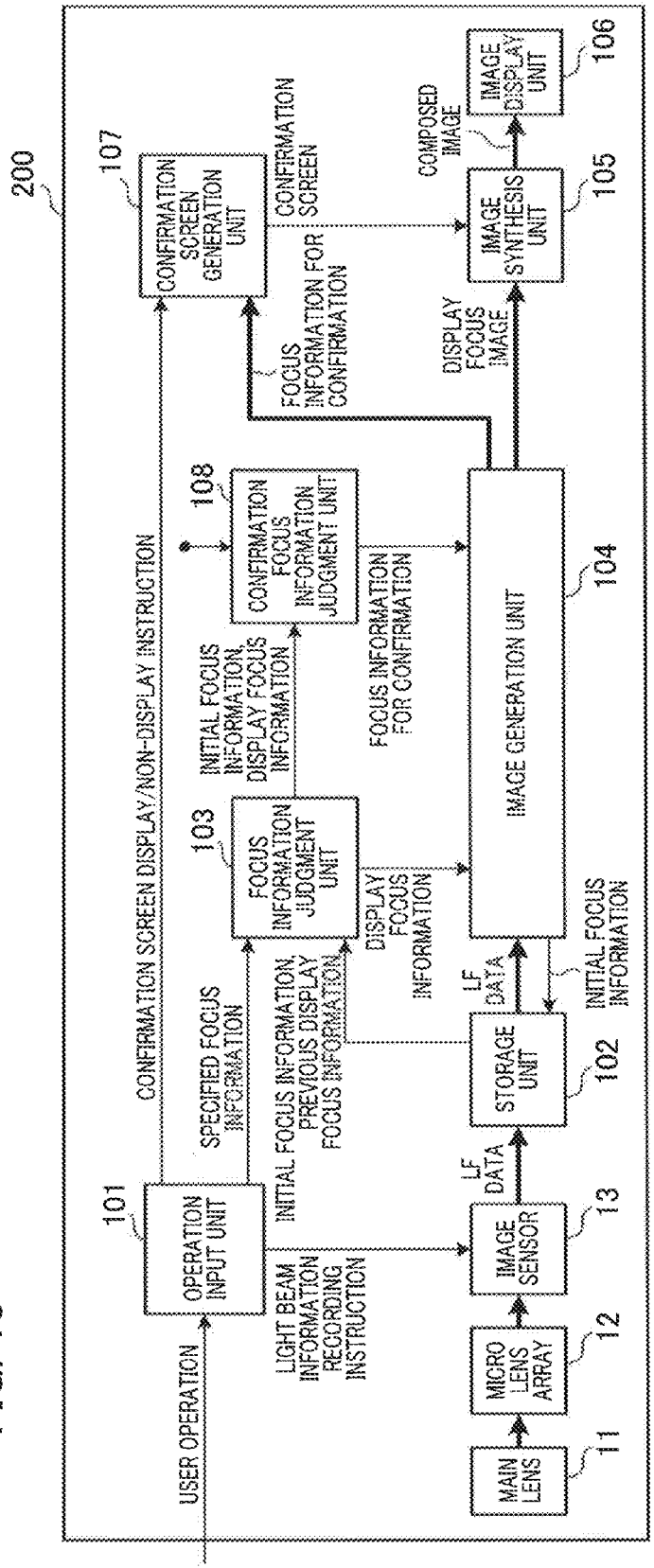

IMAGE PROCESSING APPARATUS, CONTROL METHOD, AND PROGRAM FOR THE SAME WITH FOCUS STATE SPECIFICATION AND DELETION CONFIRMATION OF IMAGE DATA

BACKGROUND OF THE INVENTION

1. Field of the Invention

The present invention relates to an image processing technique that reconstructs image data in which the focus state of a captured image is specifiable.

2. Description of the Related Art

In recent years, imaging apparatuses referred to as a "light-field camera" have been practically implemented. The imaging apparatus divides incident light into multiple light components by a micro lens array arranged on an image sensor so that the imaging apparatus can obtain light beam information by capturing light traveling in a plurality of directions. After shooting, the imaging apparatus executes predetermined calculation processing based on the intensity of light and the light incident direction so that an image with any focal distance and any depth of field (hereinafter collectively referred to as "focus information") can be configured. The advantage of the light-field camera is that any image can be configured by executing calculation processing after shooting by utilizing light beam information.

On the other hand, a user can freely perform a file operation such as a deletion operation or the like to image files stored in a storage device of an image display apparatus. A technique for displaying another image during deletion processing for deleting an image is known. Japanese Patent Laid-Open No. 2008-289065 discloses a technique for setting a protect flag to a multi-viewpoint image acquired by an imaging unit and recording the multi-viewpoint image when performing shooting in a multi-viewpoint image capturing mode. Since it is determined whether or not a captured image is a multi-viewpoint image captured in the multi-viewpoint image capturing mode during a deletion operation so as to protect a captured multi-viewpoint image data, the deletion/editing of an image cannot be made without permission. Japanese Patent Laid-Open No. 2009-159357 discloses a technique that is capable of adjusting the depth of field of an image or adjusting an image blur after shooting.

However, when a user performs a deletion operation for an image captured by a light-field camera, image data may accidentally be deleted without confirming a desired focused image if the image data is processed by the specification of focus information by the user.

Although the technique disclosed in Japanese Patent Laid-Open No. 2008-289065 prohibits the deletion of multi-viewpoint image data without permission, the technique does not determine whether or not a focused image being displayed is an image which is desired to be confirmed by a user upon deletion. In order to prevent a user from deleting a desired focused image without confirmation, the user needs to separately perform a confirmation operation of a desired focused image after a warning is made.

SUMMARY OF THE INVENTION

The present invention provides an image processing apparatus that can confirm a desired focused image by a user upon deletion operation of image data in which the focus state is specifiable.

According to an aspect of the present invention, an image processing apparatus generates an image data in which a focus state of a captured image is specified and includes an operating unit configured to specify the focus state of the image; an image generating unit configured to generate an image data of which the focus state has been specified by the operating unit; a display data generating unit configured to generate a display data for deletion confirmation upon deletion operation of the image data; and an outputting unit configured to output the image data generated by the image generating unit and the display data generated by the display data generating unit. When the focus state is changed by the specification made by the operating unit, the image generating unit generates image data in a predetermined focus state differing from the changed focus state upon deletion operation of the image data.

According to the present invention, an image processing apparatus that can confirm a desired focused image by a user upon deletion operation of image data in which the focus state is specifiable may be provided.

Further features of the present invention will become apparent from the following description of exemplary embodiments with reference to the attached drawings.

BRIEF DESCRIPTION OF THE DRAWINGS

FIG. 18 is a block diagram illustrating an example of a configuration of an apparatus according to a third embodiment of the present invention.

DESCRIPTION OF THE EMBODIMENTS

Hereinafter, preferred embodiments of the present invention will be described in detail with reference to the attached drawings.

First Embodiment

Figure 1A:
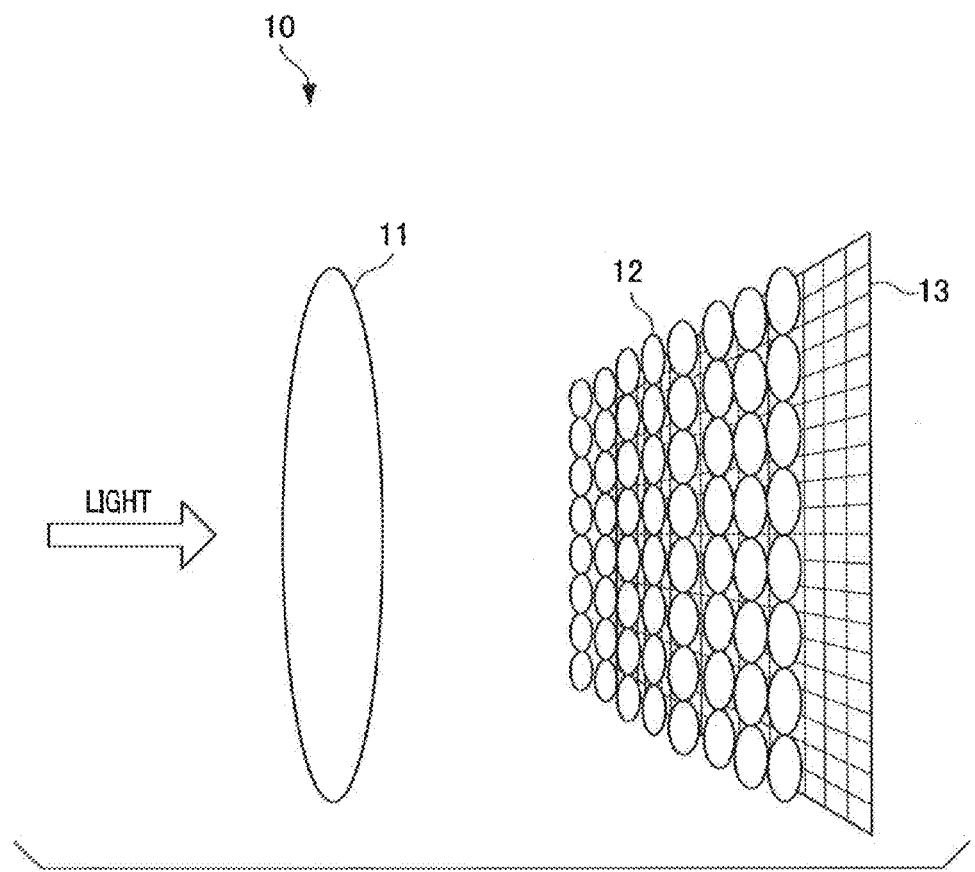
FIGS. 1A and 1B are schematic diagrams illustrating an example of the internal configuration of a light-field camera.
Figure 1B:
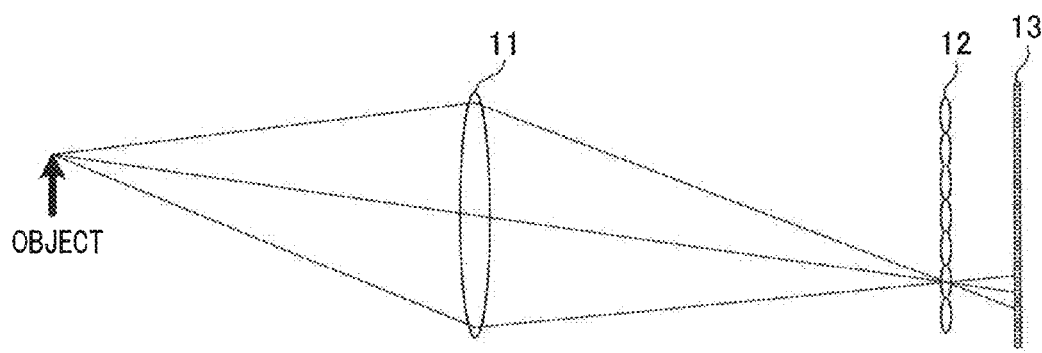

FIGS. 1A and 1B are schematic diagrams illustrating an example of the internal configuration of a light-field camera. Light from an object, which is incident on a micro lens array 12 by passing through an imaging lens 11, is photoelectrically converted into an electrical signal by an image sensor 13. Note that the obtained imaging data is referred to as "light-field data" (hereinafter referred to as "LF data").

The imaging lens 11 projects light from an object onto the micro lens array 12. The imaging lens 11 is an interchangeable lens that is mounted to the main body of an imaging apparatus 10. A user can change an imaging magnification by the zoom operation of the imaging lens 11. The micro lens array 12 is configured by arranging a plurality of micro lenses in a grid and is located between the imaging lens 11 and the image sensor 13. Each of the micro lenses constituting the micro lens array 12 divides incident light from the imaging lens 11 into divided light components and outputs the divided light components to the image sensor 13. The image sensor 13 constituting the imaging unit is an imaging element having a plurality of pixels, where the intensity of light is detected in each pixel. The respective lights divided by each micro lens are incident on each pixel of the image sensor 13 for receiving light from an object.

Figure 2:
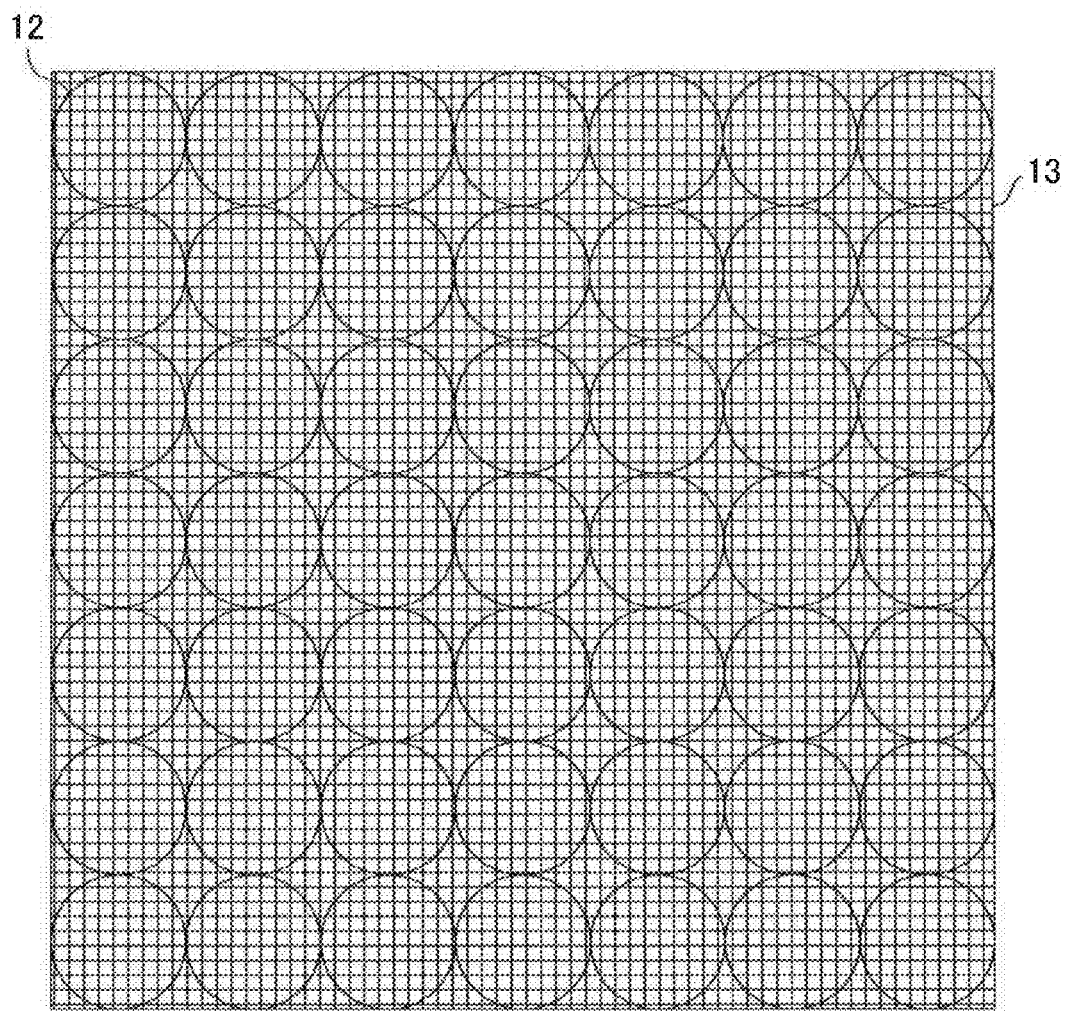
FIG. 2 is a schematic diagram illustrating the positional relationship between the micro lens array 12 and each pixel of the image sensor 13.

FIG. 2 is a schematic diagram illustrating the positional relationship between the micro lens array 12 and each pixel of the image sensor 13.

Each micro lens of the micro lens array 12 is arranged so as to correspond to a plurality of pixels of the image sensor 13. Light divided by each micro lens is incident on each pixel of the image sensor 13, and the intensity of light (light beam information) from different directions can be detected by each pixel. Also, the incidence direction (directional information) of a light beam incident on each pixel of the image sensor 13 via micro lenses can be found depending on the positional relationship between each micro lens and each pixel of the image sensor 13. In other words, information of the direction of travel of light is detected in conjunction with the intensity distribution of light. An image in a focal plane having different distances from the lens vertex surfaces of the micro lens array 12 is obtained by combining the outputs of the pixels of the image sensor 13, which are placed at positions corresponding to the eccentricity from the optical axis of each micro lens. Note that a light beam is represented by a function which is parameterized by parallel two planes using parameters such as a position, an orientation, a wavelength, or the like. In other words, the direction of light incident on each pixel is determined by the arrangement of a plurality of pixels corresponding to each micro lens.

As described above, the imaging apparatus 10 acquires light beam information and directional information performs light beam rearrangement/calculation processing (hereinafter referred to as "reconstruction") to thereby be able to generate image data of any focus position or any viewpoint. Light beam information and directional information are included in LF data.

Figure 3:
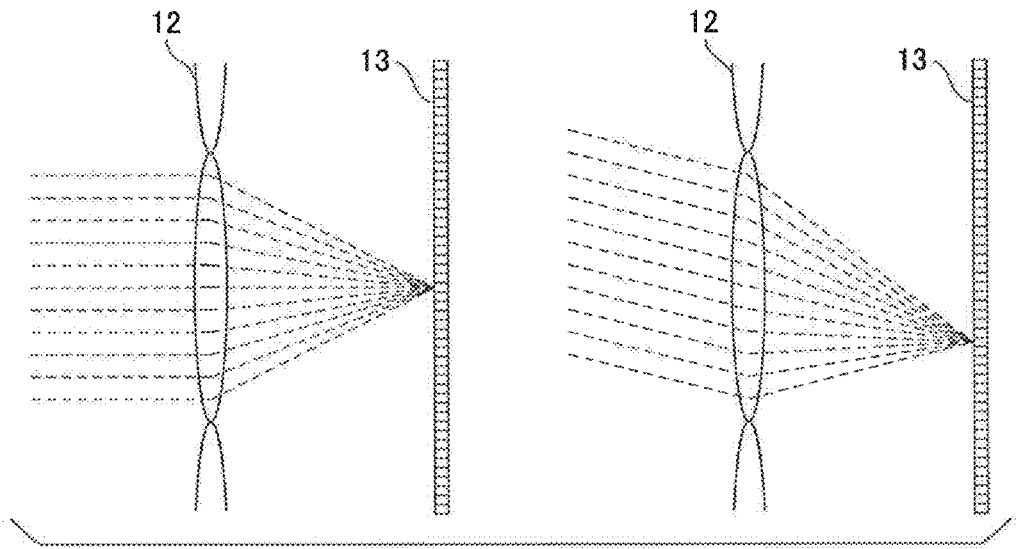
FIG. 3 is a schematic diagram illustrating the relationship between the direction of travel of a light beam incident on a micro lens and the recording area of the image sensor 13.

FIG. 3 is a schematic diagram illustrating the relationship between the direction of travel of a light beam incident on the micro lens of the micro lens array 12 and the recording area of the image sensor 13.

An object image formed by the imaging lens 11 is focused on the micro lens array 12, and a light beam incident on the micro lens array 12 is received by the image sensor 13 via the micro lens array 12. At this time, as shown in FIG. 3, a light beam incident on the micro lens array 12 is received at different positions on the image sensor 13 depending on the direction of travel of light, and thus, an object image having a shape similar to that of the imaging lens 11 is focused for each micro lens.

Figure 4:
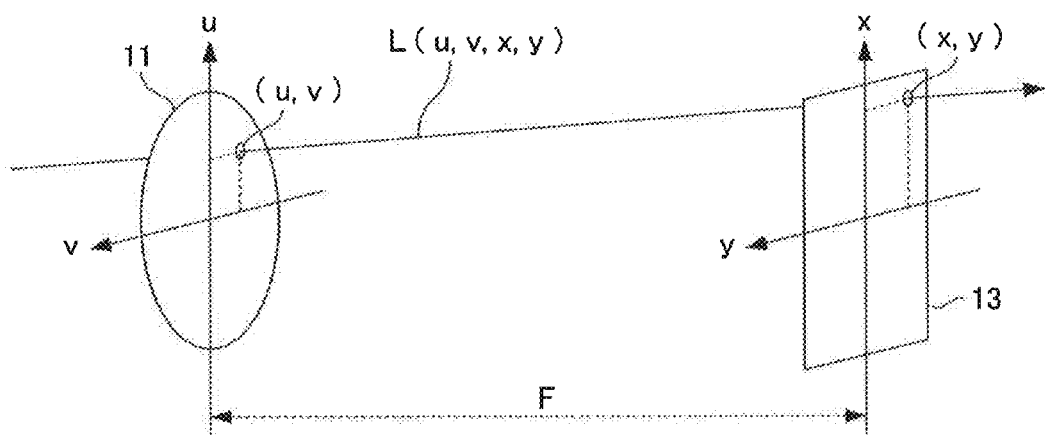
FIG. 4 is a schematic diagram illustrating information of a light beam incident on the image sensor 13.

FIG. 4 is a schematic diagram illustrating information of a light beam incident on the image sensor 13.

A description will be given of a light beam received by the image sensor 13 with reference to FIG. 4. Here, an assumption is made that the orthogonal coordinate system on the lens plane of the imaging lens 11 is given as (u, v), the orthogonal coordinate system on the imaging surface of the image sensor 13 is given as (x, y), and the distance between the lens plane of the imaging lens 11 and the imaging surface of the image sensor 13 is given as F. Thus, the intensity of a light beam passing through the imaging lens 11 and the image sensor 13 can be represented by the four-dimensional function L (u, v, x, y) as shown in FIG. 4.

Since a light beam incident on each micro lens is incident on different pixels depending on the direction of travel of light, not only light beam positional information but also the four-dimensional function L (u, v, x, y) for holding the direction of travel of a light beam are recorded on the image sensor 13.

Figure 5:
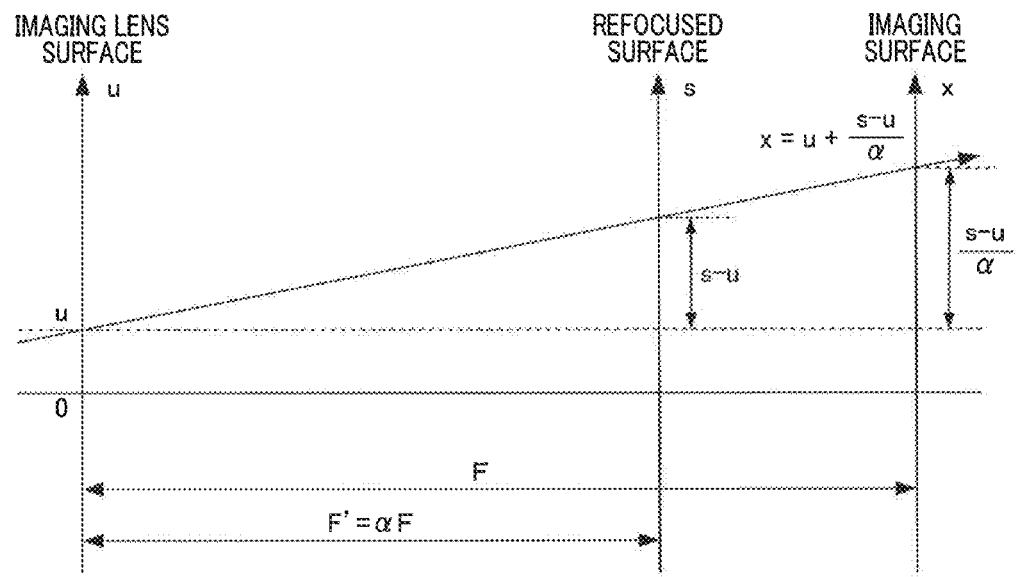
FIG. 5 is a schematic diagram illustrating refocusing arithmetic processing.

Next, a description will be given of refocusing arithmetic processing after imaging. FIG. 5 is a schematic diagram illustrating refocusing arithmetic processing. When the positional relationship among the imaging lens surface, the imaging surface, and the refocused surface is set as shown in FIG. 5, the intensity L' (u, v, s, t) of a light beam in the orthogonal coordinate system (s, t) on the refocused surface is represented by the following Formula (1).

$$L'(u, v, s, t) = L\left(u, v, u + \frac{s-u}{\alpha}, v + \frac{t-v}{\alpha}\right) \quad (1)$$

Also, since an image E'(s, t) obtained on a refocused surface is obtained by integrating the intensity L' (u, v, s, t) with respect to the lens aperture, the image E'(s, t) is represented by the following Formula (2).

$$E'(s, t) = \frac{1}{\alpha^2 F^2} \int\int L\left(u, v, u + \frac{s-u}{\alpha}, v + \frac{t-v}{\alpha}\right) du dv \quad (2)$$

Thus, refocusing arithmetic processing is performed by using Formula (2), so that an image set to any focus point (refocused surface) can be reconstructed.

Next, a description will be given of depth of field adjustment processing after imaging. Prior to refocusing arithmetic processing, weighting is performed by multiplying a weighting factor for each image data that forms an image region assigned to each micro lens. For example, when an image with a deep depth of field wants to be generated, integration processing is performed only by using information of a light beam incident on the light receiving surface of the image sensor 13 at a relatively small angle. In other words, for a light beam incident on the image sensor 13 at a relatively large angle, integration processing is not performed by multiplying a weighting factor "0" (zero).

Figure 6:
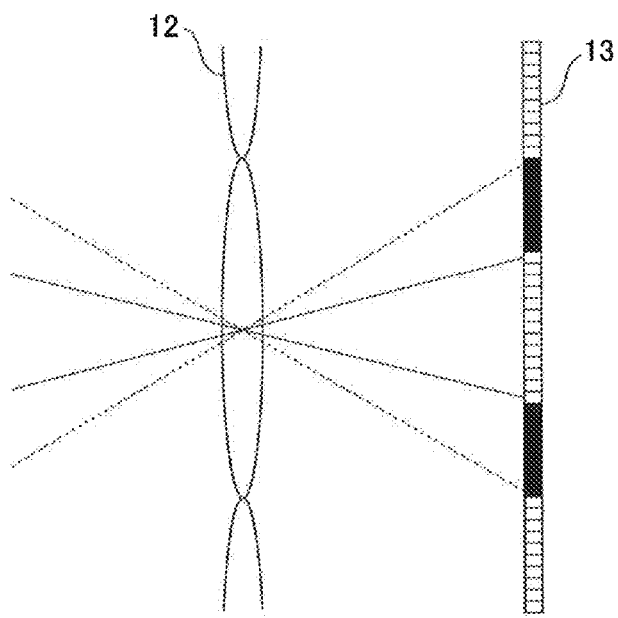
FIG. 6 is a schematic diagram illustrating the relationship between the difference in angle of incidence on a micro lens and the recording area of the image sensor 13.
Figure 7:
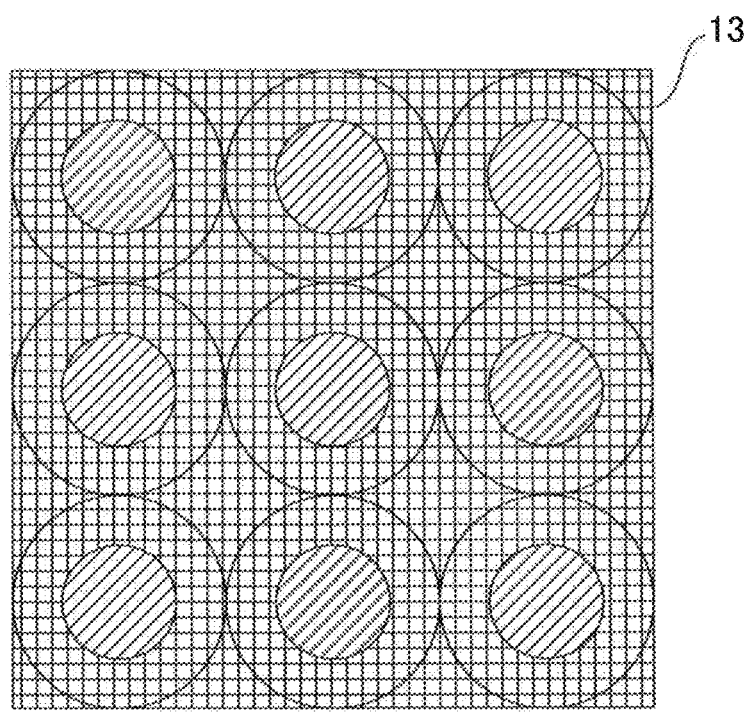
FIG. 7 is a schematic diagram illustrating depth of field adjustment processing.

FIG. 6 is a schematic diagram illustrating the relationship between the difference in angle of incidence on a micro lens and the recording area of the image sensor 13. FIG. 7 is a schematic diagram illustrating depth of field adjustment processing.

As shown in FIG. 6, a light beam of which the angle of incidence to the image sensor 13 is relatively small is positioned at a more central region. Thus, as shown in FIG. 7, integration processing is performed only by using pixel data acquired by the central portion (hatched portion in FIG. 7) of the region. With the aid of such processing, an image with a deep depth of field can be expressed as if an aperture diaphragm provided in a typical imaging apparatus is closed. A deep focus image (pan focus image) with a deeper depth of field can also be generated by further reducing pixel data for use at the central portion of the region. As described above, the depth of field of an image after shooting can be adjusted based on the actually acquired LF data (light beam information).

Figure 8:
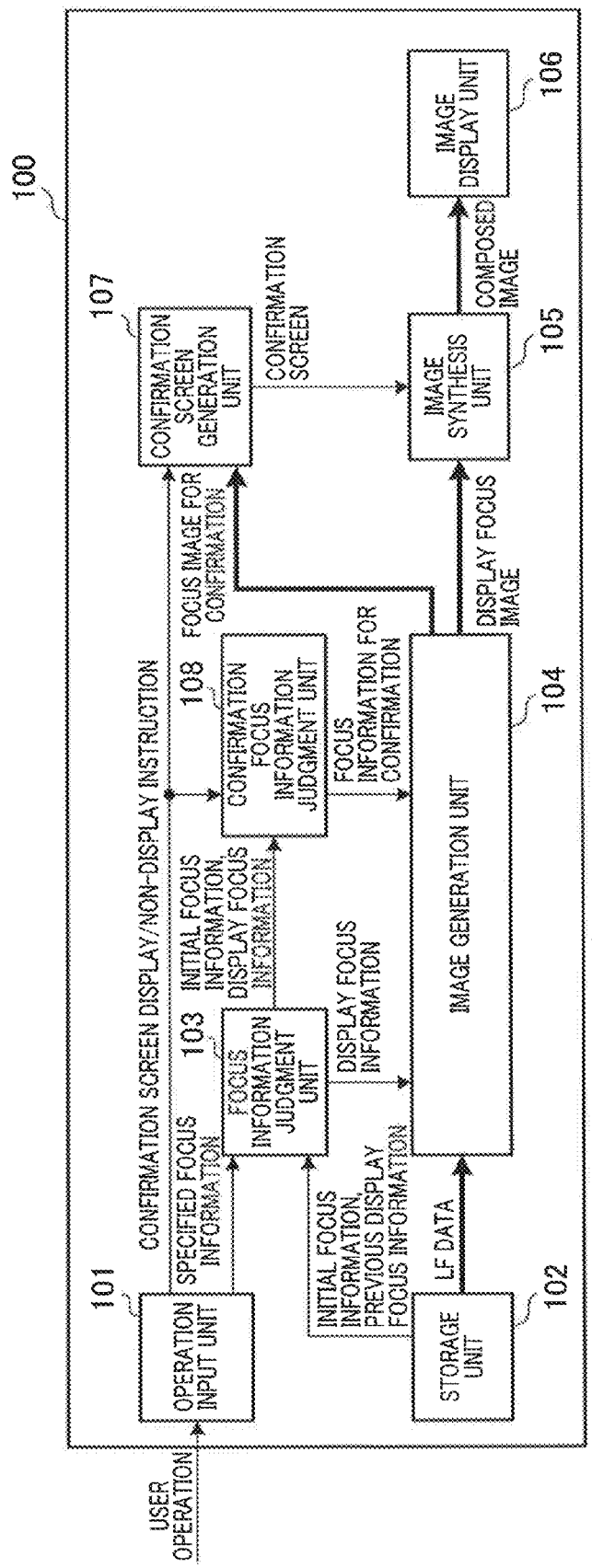
FIG. 8 is a block diagram illustrating an example of a configuration of an image display apparatus.

FIG. 8 is a block diagram illustrating an example of a configuration of an image display apparatus of the present embodiment.

An operation input unit 101 is used for inputting an operation signal generated by a user operation. For example, when an operation for specifying focus information is made, the operation input unit 101 outputs specified focus information to a focus information judgment unit (hereinafter referred to as "information judgment unit") 103. Focus information is information relating to specification of a focus state and includes focal distance information and depth of field information of an imaging optical system, lens characteristics of an imaging apparatus, the depth of focus, and the like. When a file deletion operation is performed, the operation input unit 101 outputs a confirmation screen display instruction upon deletion to a confirmation screen generation unit 107 and a confirmation focus information judgment unit (hereinafter referred to as "confirmation information judgment unit") 108. A storage unit 102 stores LF data, initial focus information, and previous display focus information. Initial focus information is focus information to be initially referenced when an image is constructed from LF data. In the present embodiment, initial focus information is intended to be information to be specified by a user operation upon shooting or information to be set by a user operation at the end of shooting in order to reflect the intention of a user. Note that initial focus information is not limited to the above definition but may also be focus information to be set by automatically recognizing an object in an image upon shooting or upon displaying (e.g., deep-focus information in which all objects which are capable of being focused are in focus).

Also, previous display focus information is final focus information obtained when a user specifies focus information upon previous image display. An image is intended to be reconstructed with reference to previous display focus information upon second and subsequent image display. While, in the present embodiment, previous display focus information is stored in the storage unit 102 every time the information is changed by specification, previous display focus information may also be stored in the storage unit 102 only when a user executes a storage operation.

The information judgment unit 103 judges focus information (display focus information) of a display image using the specified focus information from the operation input unit 101 and the initial focus information and previous display focus information acquired from the storage unit 102 to thereby output the focus information to an image generation unit 104. The image generation unit 104 performs the aforementioned refocusing arithmetic processing and depth of field adjustment processing in accordance with the display focus information acquired from the information judgment unit 103 based on the LF data acquired from the storage unit 102 to thereby reconstruct an image. Reconstructed image data is output as display focus image data to an image synthesis unit 105. When focus information for confirmation is input from the confirmation information judgment unit 108, the image generation unit 104 reconstructs an image from LF data in accordance with focus information for confirmation, and then outputs the generated data to the confirmation screen generation unit 107.

When the confirmation screen generation unit 107 receives a confirmation screen display instruction from the operation input unit 101, the confirmation screen generation unit 107 generates confirmation screen display data and outputs to the image synthesis unit 105. When focus image data for confirmation is input from the image generation unit 104, the confirmation screen generation unit 107 performs processing for combining focus image data for confirmation with a confirmation screen. When the confirmation information judgment unit 108 receives the confirmation screen display instruction from the operation input unit 101, the confirmation information judgment unit 108 acquires initial focus information and display focus information from the information judgment unit 103 and judges focus information for confirmation so as to output it to the image generation unit 104.

The image synthesis unit 105 generates image data by combining the display focus image data acquired from the image generation unit 104 and the confirmation screen display data acquired from the confirmation screen generation unit 107 and then outputs the generated image data to an image display unit 106. Note that the image generation unit 104 may also output focus image data for confirmation to the image synthesis unit 105 without outputting focus image data for confirmation to the confirmation screen generation unit 107.

The image display unit 106 is a liquid crystal panel, a plasma display, or the like that displays an image in accordance with image data output by the image synthesis unit 105. In an embodiment in which an external display device is used instead of the image display unit 106, an image data output unit is provided.

Figure 9:
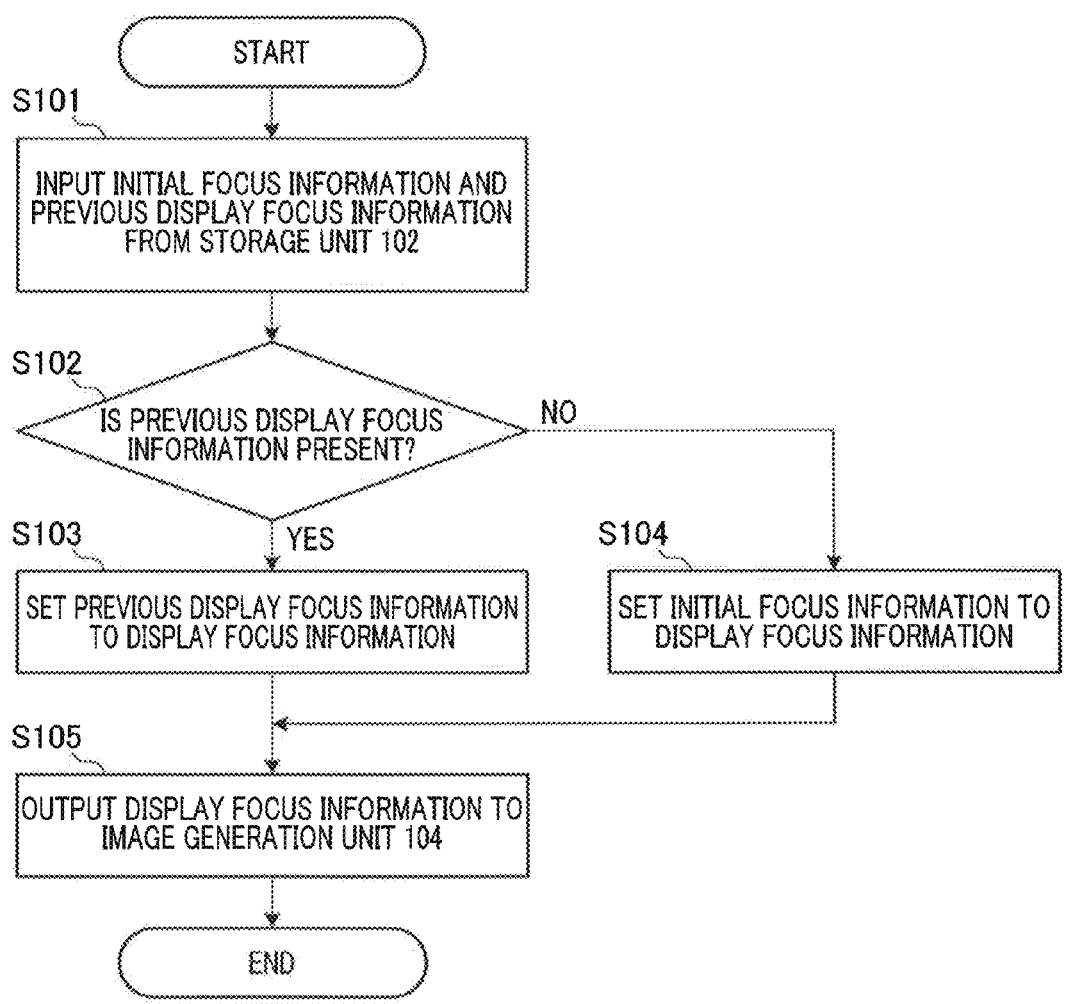
FIG. 9 is a flowchart illustrating an example of information judgment processing when image initial display is to be performed.

FIG. 9 is a flowchart illustrating an example of processing performed by the information judgment unit 103 when image initial display is to be performed.

Initial focus information and previous display focus information are input to the information judgment unit 103 from the storage unit 102 (step S101). The information judgment unit 103 judges the presence/absence of previous display focus information (step S102). When there is previous display focus information, the process advances to step S103. When there is no previous display focus information, the process advances to step S104.

In step S103, the information judgment unit 103 sets previous display focus information as display focus information. In step S104, the information judgment unit 103 sets initial focus information as display focus information. After step S103 or step S104, the process advances to step S105, and the information judgment unit 103 outputs the determined display focus information to the image generation unit 104. Then, the process ends.

Figure 10:
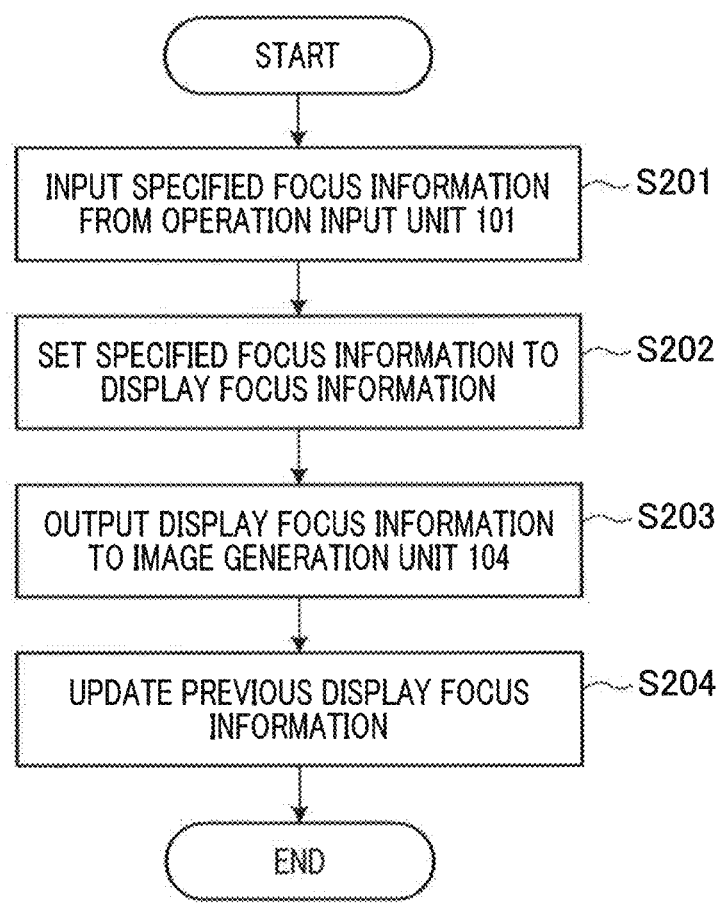
FIG. 10 is a flowchart illustrating an example of information judgment processing when a focus state is to be specified.

FIG. 10 is a flowchart illustrating an example of processing performed by the information judgment unit 103 when focus information is specified by a user operation.

Specified focus information is input from the operation input unit 101 to the information judgment unit 103 (step S201). Specified focus information is focus information that has been newly specified by a user operation. The information judgment unit 103 sets specified focus information as display focus information (step S202). The information judgment unit 103 outputs the judged display focus information to the image generation unit 104 (step S203), and updates previous display focus information with specified focus information (step S204). Then, the process ends.

Figure 11:
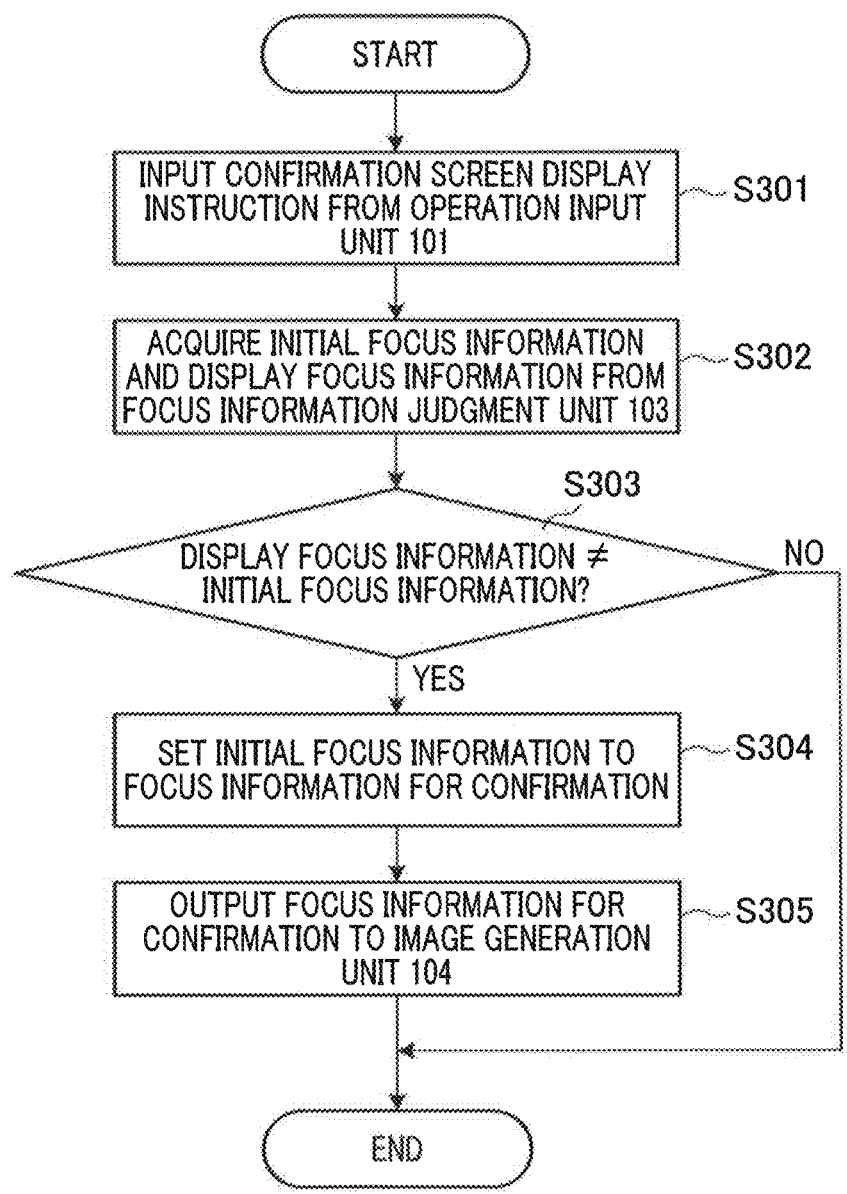
FIG. 11 is a flowchart illustrating an example of confirmation information judgment processing when a deletion operation is performed.

FIG. 11 is a flowchart illustrating an example of processing performed by the confirmation information judgment unit 108 when an image file is deleted by a user operation.

A deletion confirmation screen display instruction is input from the operation input unit 101 to the confirmation information judgment unit 108 (step S301). The confirmation information judgment unit 108 acquires initial focus information and display focus information from the information judgment unit 103 (step S302). The confirmation information judgment unit 108 judges whether or not current display focus information and initial focus information are identical (step S303). When the confirmation information judgment unit 108 judges that current display focus information and initial focus information are not identical, that is, when focus information is changed from initial focus information, the process advances to step S304. When the confirmation information judgment unit 108 judges that current display focus information and initial focus information are identical, that is, when focus information is not changed from initial focus information, the process ends.

The confirmation information judgment unit 108 sets initial focus information as focus information for confirmation (step S304), and outputs the set focus information for confirmation to the image generation unit 104 (step S305). Then, the process ends.

Figure 12A:
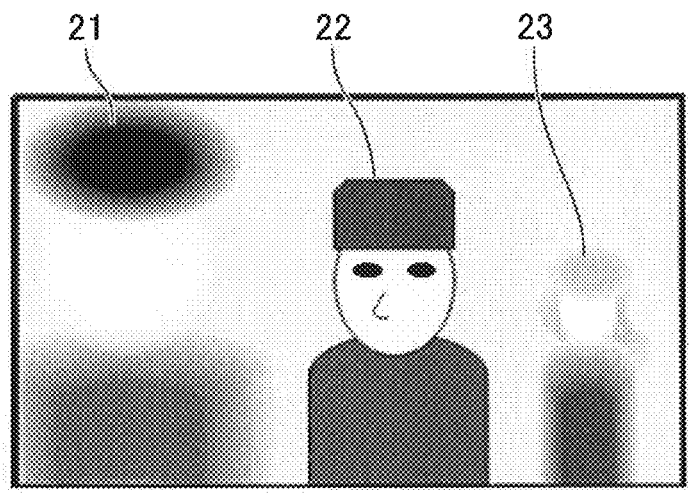
FIG. 12A is a diagram illustrating an exemplary screen obtained upon initial focused image display.

FIG. 12A shows an exemplary screen obtained when a focused image reflecting initial focus information is displayed. In the initial focus information, focus information is set such that the object 22 is in focus and images from the objects 21 and 23 have a large degree of blur.

Figure 12B:
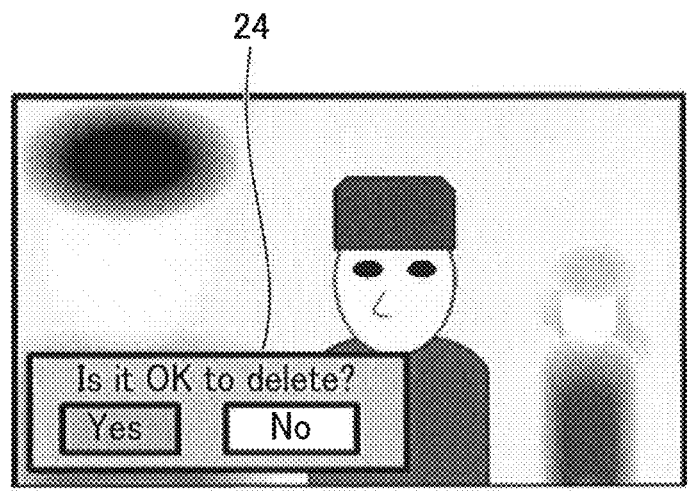
FIG. 12B is a diagram illustrating an exemplary screen to be displayed when a user performs a deletion operation while an image is being displayed.

FIG. 12B shows an exemplary screen to be displayed when a user performs a deletion operation while the image shown in FIG. 12A is being displayed. In this case, since it is judged that display focus information and initial focus information are identical in step S303 shown in FIG. 11, a focused image for confirmation is not displayed. In other words, a deletion confirmation screen 24 is configured to include a character string or the like. For example, a message for prompting a user to confirm deletion, an operation button object, and the like are provided on the deletion confirmation screen 24.

Figure 13A:
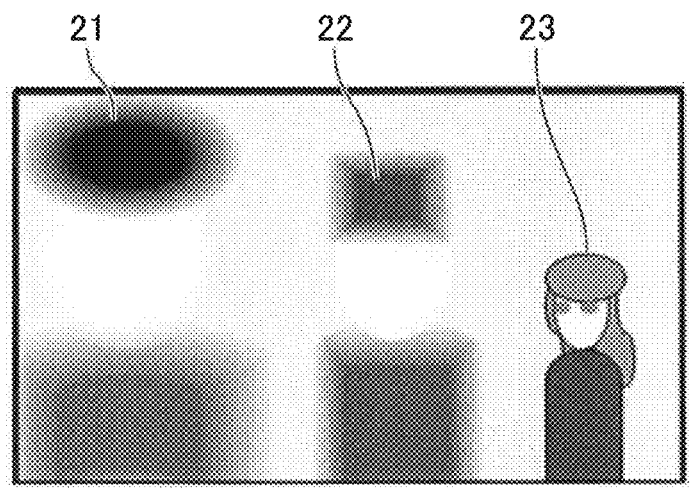
FIG. 13A is a diagram illustrating an exemplary screen obtained when an image in which focus information has been specified is displayed.

FIG. 13A shows an exemplary screen obtained when a focused image reflecting display focus information specified by a user operation is displayed. In the display focus information, focus information is set such that the object 23 is in focus and images from the objects 21 and 22 have a large degree of blur.

Figure 13B:
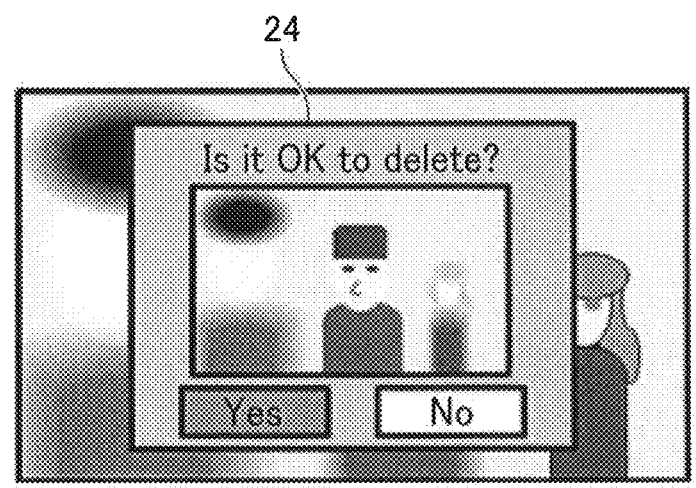
FIG. 13B is a diagram illustrating an exemplary screen to be displayed when a user performs a deletion operation while an image is being displayed.

FIG. 13B shows an exemplary screen to be displayed when a user performs a deletion operation while the image shown in FIG. 13A is being displayed. In this case, since it is judged that display focus information and initial focus information are not identical in step S303 shown in FIG. 11, initial focus information is output as focus information for confirmation to the image generation unit 104. When the confirmation screen generation unit 107 receives a focused image data for confirmation reconstructed by the image generation unit 104, the confirmation screen generation unit 107 combines a focused image for confirmation, i.e., initial focused image data on the deletion confirmation screen 24 and then outputs the combined data to the image synthesis unit 105. In this manner, the deletion confirmation screen 24 is configured to include an initial focused image and a character string such as a message, and then a user can confirm the initial focused image.

The aforementioned processing can also be realized by causing a computer included in an image processing apparatus to execute an image processing program read from a memory. In other words, in the operating step, a computer receives a user operation instruction of focus information for specifying the focus state of an image. When image focus information is specified in the operating step, the image generation unit 104 generates image data using predetermined focus information (which is different from the changed focus state) prior to specification. When a user performs an image data deletion operation, a display data generating step of generating display data for deletion confirmation including image data generated by using predetermined focus information prior to specification is executed. The generated display data is output from the image synthesis unit 105 to the image display unit 106, and then the deletion confirmation screen is displayed.

According to the first embodiment, when a deletion operation for deleting image data in which focus information can be arbitrarily specified is performed, control for displaying initial focused image for confirmation is executed. By displaying an image prior to specification of focus information on the deletion confirmation screen, an attention is attracted to the user so as not to erroneously delete a desired focused image without confirmation, resulting in prevention of erroneous erasure.

Second Embodiment

Next, a description will be given of a second embodiment of the present invention. In the second embodiment, a description will be given of an example in which an image prior to specification of focus information and a deep focus image are simultaneously displayed when a deletion operation for deleting an image file in which focus information can be arbitrarily specified is performed. A deep focus image is an image in which all objects which are capable of being focused are in focus. According to the light field technique, a deep focus image can be generated.

Hereinafter, a description will be given mainly of the differences from the first embodiment. Components corresponding to or similar to those in the first embodiment are designated by the same reference numerals, and therefore, its explanation will be omitted. A description of the embodiments to be described below will be omitted in the same way.

Figure 14:
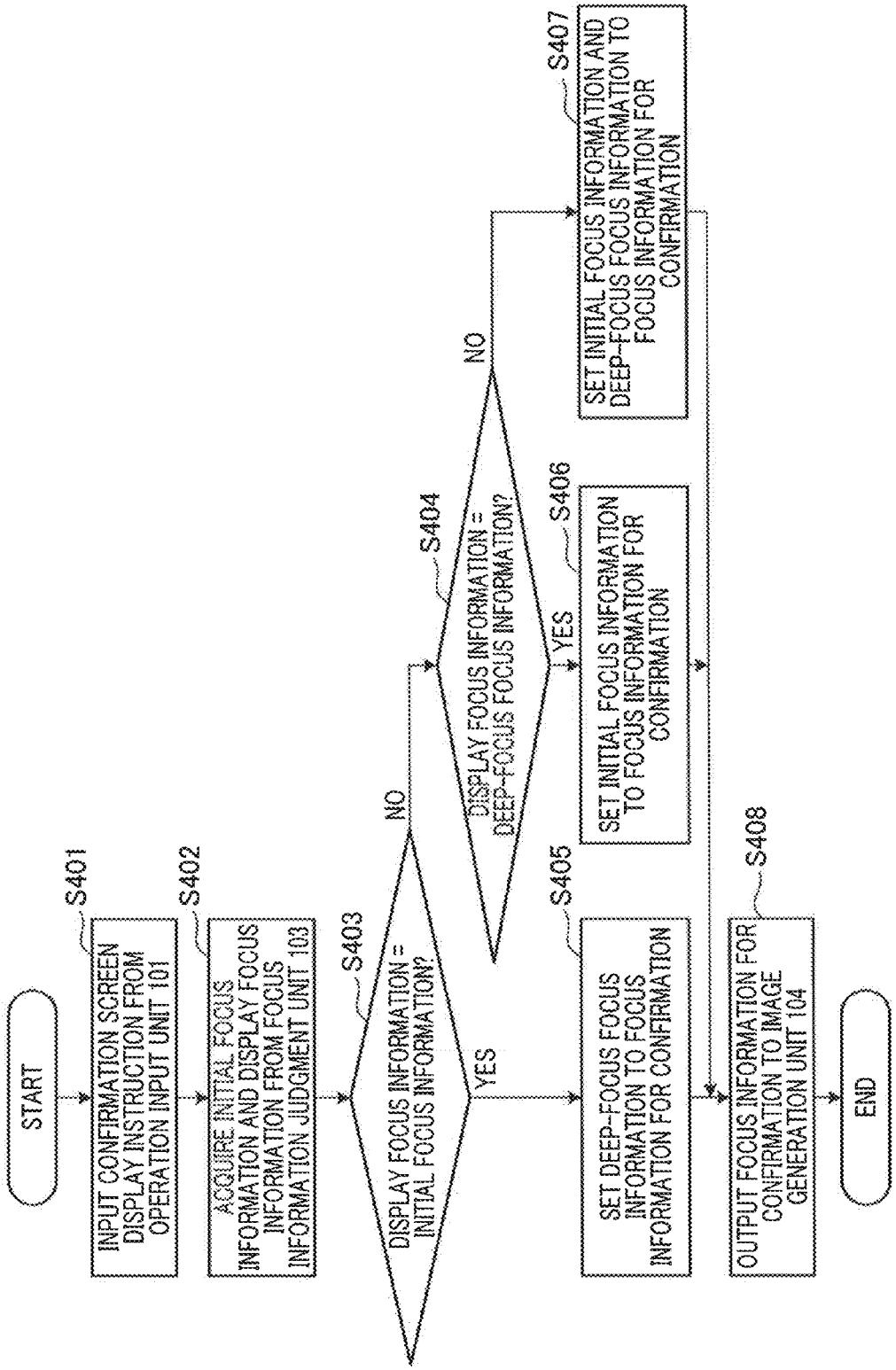
FIG. 14 is a flowchart illustrating an example of confirmation information judgment processing when a deletion operation is performed for the purpose of describing a second embodiment of the present invention.

FIG. 14 is a flowchart illustrating an example of processing performed by the confirmation information judgment unit 108 when a deletion operation for deleting an image file is performed by a user operation. Since the processes from step S401 to step S403 are the same as those from step S301 to step S303 shown in FIG. 11, a description will be given of processing in steps S404 to S408. When current display focus information and initial focus information are not identical in step S403, that is, when focus information is changed from initial focus information, the process advances to step S404. When current display focus information and initial focus information are identical in step S403, that is, when focus information is not changed from initial focus information, the process advances to step S405.

In step S404, the confirmation information judgment unit 108 judges whether or not current display focus information is set to deep-focus information. Deep-focus information refers to focus information for obtaining an image in which all objects which are capable of being focused are in focus. When the confirmation information judgment unit 108 judges that current display focus information is set to deep-focus information, the process advances to step S406. When current display focus information is not set to deep-focus information, the process advances to step S407.

In step S405, the confirmation information judgment unit 108 sets deep-focus information as focus information for confirmation. In step S406, the confirmation information judgment unit 108 sets initial focus information as focus information for confirmation. In step S407, the confirmation information judgment unit 108 sets initial focus information and deep-focus information as focus information for confirmation. After steps S405 to S407, the process advances to step S408. The confirmation information judgment unit 108 outputs the judged focus information for confirmation to the image generation unit 104, and then the process ends.

Figure 15:
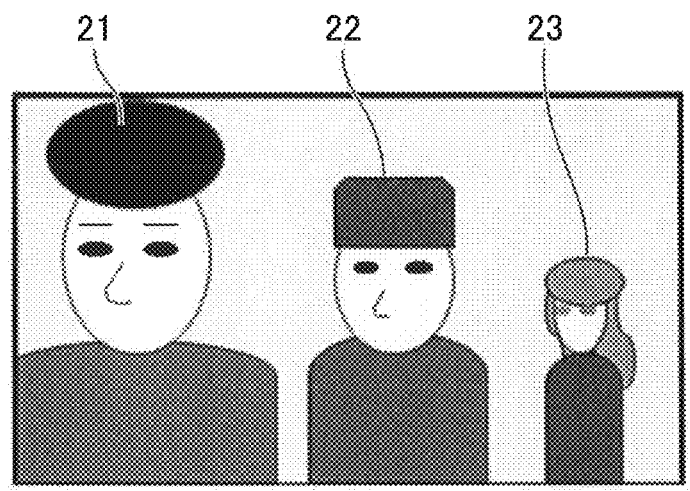
FIG. 15 is a diagram illustrating an exemplary screen obtained upon deep focus image (pan focus image) display.

FIG. 15 is a diagram illustrating an exemplary screen obtained upon deep focus image display. In the deep focus image, deep-focus information is set such that all the objects 21 to 23 are in focus.

Figure 16A:
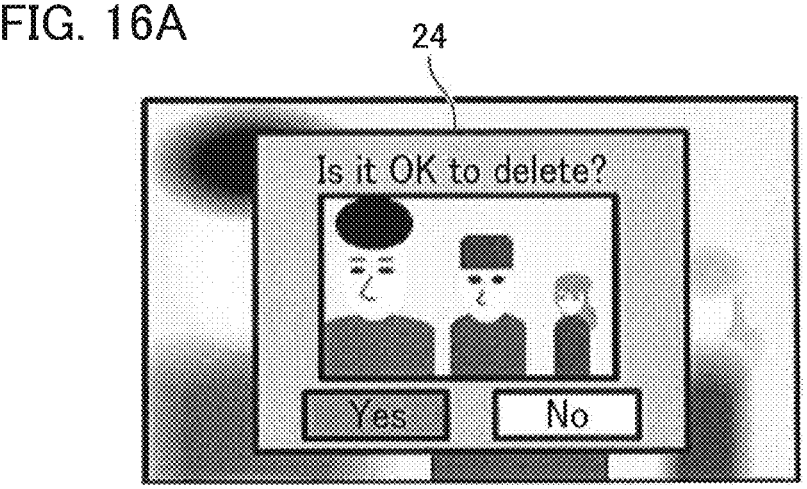
FIGS. 16A to 16C are diagrams illustrating exemplary screens to be displayed when a user performs a deletion operation while an image is being displayed.

FIG. 16A is a diagram illustrating an exemplary screen to be displayed when a user performs a deletion operation while an initial focused image as shown in FIG. 12A is being displayed. In this case, since it is judged in step S403 in FIG. 14 that display focus information and initial focus information are identical, deep-focus information is output as focus information for confirmation to the image generation unit 104. When data of a focused image for confirmation reconstructed by the image generation unit 104 is input to the confirmation screen generation unit 107, the confirmation screen generation unit 107 composes a focused image for confirmation, i.e., a deep focus image on the deletion confirmation screen 24.

Figure 16B:
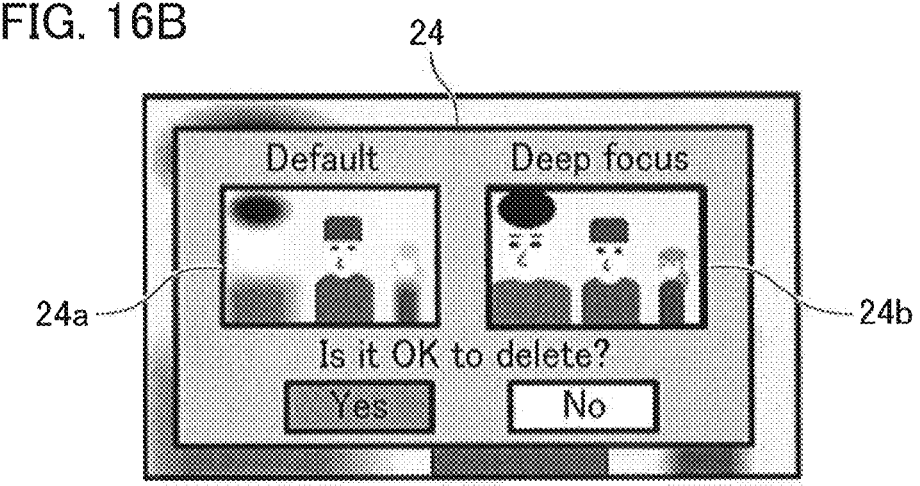

FIG. 16B is a diagram illustrating an exemplary screen to be displayed when a user performs a deletion operation while an image in which focus information is changed as shown in FIG. 13A is being displayed. In this case, it is judged in step S403 in FIG. 14 that display focus information and initial focus information are not identical. Furthermore, since it is judged in step S404 in FIG. 14 that display focus information and deep-focus information are not identical, initial focus information and deep-focus information are output as focus information for confirmation to the image generation unit 104. The image generation unit 104 reconstructs initial focused image data as first image data for confirmation and reconstructs deep focus image data as second image data for confirmation. When the initial focused image and the deep focus image data reconstructed by the image generation unit 104 are input to the confirmation screen generation unit 107, the confirmation screen generation unit 107 performs synthesis processing such that the deletion confirmation screen 24 includes an initial focused image 24a and a deep focus image 24b.

Figure 16C:
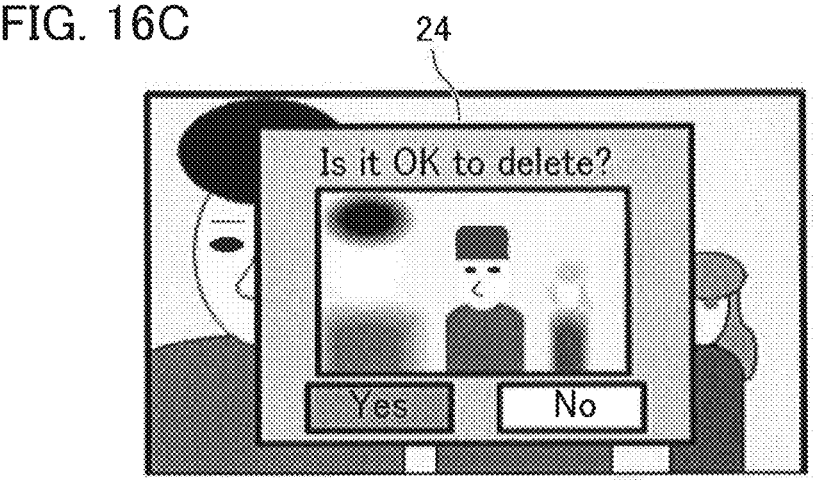

FIG. 16C is a diagram illustrating an exemplary screen to be displayed when a user performs a deletion operation while a deep focus image as shown in FIG. 15 is being displayed. In this case, it is judged in step S403 in FIG. 14 that display focus information and initial focus information are not identical. Furthermore, since it is judged in step S404 in FIG. 14 that display focus information and deep-focus information are identical, initial focus information is output as focus information for confirmation to the image generation unit 104. When the initial focused image data reconstructed by the image generation unit 104 is input to the confirmation screen generation unit 107, the confirmation screen generation unit 107 performs synthesis processing such that the deletion confirmation screen 24 includes the initial focused image.

According to the second embodiment, an initial focused image or a deep focus image (see FIGS. 16A and 16C) is provided to a user, and thereby the user can confirm a desired focused image. Also, an initial focused image and a deep focus image (see FIG. 16B) are simultaneously provided to a user, and thereby the user can confirm not only an initial focused image but also an image of all objects which cannot be recognized only by the initial focused image.

Variant Example

Figure 17:
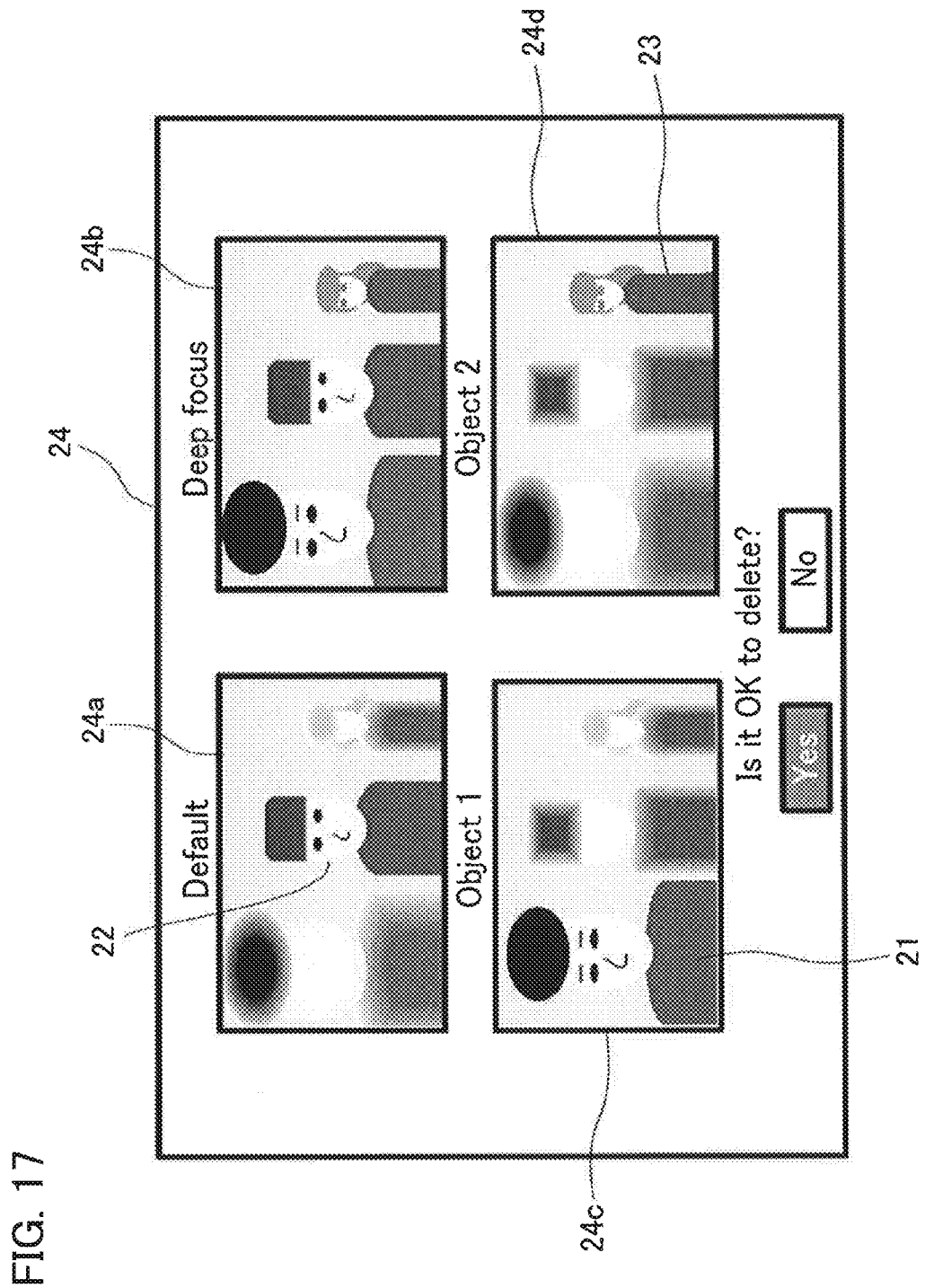
FIG. 17 is a diagram illustrating an exemplary screen according to the variant example of the second embodiment.

Next, a description will be given of a variant example of the second embodiment with reference to FIG. 17. FIG. 17 is a diagram illustrating an exemplary screen to be displayed when a user performs a deletion operation. The image generation unit 104 reconstructs not only an initial focused image and a deep focus image but also image data in which each object is in focus. In other words, initial focused image data and deep focus image data are reconstructed as first and second image data for confirmation, respectively, and a plurality of image data for confirmation is reconstructed by using focus information for each object. The confirmation screen generation unit 107 performs synthesis processing such that the deletion confirmation screen 24 includes an initial focused image 24a, a deep focus image 24b, an image 24c in which only the object 21 is in focus, and an image 24d in which only the object 23 is in focus. Thus, a user can confirm the details of all focused images which can be reconstructed from LF data on the deletion confirmation screen.

Third Embodiment

Next, a description will be given of a third embodiment of the present invention. In the third embodiment, a description will be given of a configuration in which an imaging apparatus is integrated with a display device.

FIG. 18 is a block diagram illustrating an example of a configuration of an imaging apparatus 200. The differences from FIG. 1 are the imaging lens 11, the micro lens array 12, and the image sensor 13.

When an operation signal is input by a user operation and the signal is a shutter operation signal for providing an instruction to record light beam information and directional information, the operation input unit 101 outputs an instruction for recording light beam information and directional information to the image sensor 13. When the image sensor 13 receives an instruction for recording light beam information and directional information, the image sensor 13 performs storage processing by outputting LF data including the detected light beam information and directional information to the storage unit 102.

When the initial focus information acquired from the storage unit 102 is unset, that is, immediately after recording LF data, the information judgment unit 103 does not output display focus information to the image generation unit 104. When it is judged that no display focus information is input from the information judgment unit 103, the image generation unit 104 analyses LF data and reconstructs an image based on focus information in which at least one object can be in focus. At this time, focus information is stored as initial focus information in the storage unit 102.

According to the third embodiment, an imaging apparatus is integrated with an image display apparatus and a user can confirm a desired focused image during a deletion operation, resulting in prevention of erroneous erasure of image data by a user.

In the above embodiments, a description has been given of a light-field camera that detects light in different directions by detecting light divided by the micro lens array 12 by the image sensor 13 as an exemplary apparatus for acquiring LF data. However, the configuration of an apparatus for acquiring LF data is not limited thereto but a configuration in which light in different directions is detected by a multi-eye camera may also be employed.

The present invention may also be realized by executing the following processing. Specifically, software (program) for realizing the functions of the aforementioned embodiments is supplied to a system or an apparatus via a network or various types of storage mediums, and then the computer (or CPU, MPU, or the like) of the system or the apparatus reads out the program for execution.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-151825 filed on Jul. 5, 2012, and Japanese Patent Application No. 2013-117848 filed on Jun. 4, 2013, which are hereby incorporated by reference herein in their entirety.

What is claimed is:

1. An image processing apparatus that generates image data in which a focus state of a captured image is specified, the image processing apparatus comprising:
    a processor; and
    a memory coupled to the processor to store instructions that cause the processor to perform operations of at least one of a plurality of units of the image processing apparatus including:
        a specifying unit configured to specify a focus state of an image;
        an image generating unit configured to acquire information indicating an intensity of light related to a captured image and information indicating a direction of light related to the captured image to generate image data of which the focus state has been specified by the specifying unit;
        a display data generating unit configured to generate display data for deletion confirmation upon a deletion operation of the image data; and
        an outputting unit configured to output the image data generated by the image generating unit and the display data generated by the display data generating unit,
        wherein, when the focus state is changed by a specification made by the specifying unit, the image generating unit generates image data in a predetermined focus state differing from the changed focus state upon the deletion operation of the image data.

2. The image processing apparatus according to claim 1, wherein the image generating unit acquires focal distance information and depth of field information as the focus state specified by the specifying unit to generate the image data.

3. The image processing apparatus according to claim 1, wherein, when the focus state is changed by the specification made by the specifying unit, the image generating unit outputs first image data generated by using focus information differing from the changed focus state and second image data generated by using focus information for a plurality of objects to the display data generating unit upon the deletion operation of the image data, and the display data generating unit generates display data for deletion confirmation including the first image data and the second image data received from the image generating unit.

4. The image processing apparatus according to claim 1, wherein, when the focus state is changed by the specification made by the specifying unit, the image generating unit outputs first image data generated by using focus information differing from the changed focus state and a plurality of image data where each of which is generated by using focus information for each object to the display data generating unit upon deletion operation of the image data, and the display data generating unit generates display data for deletion confirmation including the first image data and the plurality of image data received from the image generating unit.

5. The image processing apparatus according to claim 1, further comprising:
    a storing unit configured to store a focus information set at the end of imaging or a focus information set by recognizing an object in an image,
    wherein, when a focus state differing from a focus state corresponding to focus information acquired from the storing unit is specified, the image generating unit outputs image data generated by using the focus information acquired from the storing unit to the display data generating unit upon deletion operation of the image data, and the display data generating unit generates display data for deletion confirmation including the image data.

6. The image processing apparatus according to claim 1, further comprising:
    an imaging unit configured to receive light from an object via an imaging optical system,
    wherein the imaging unit includes a plurality of micro lenses and a plurality of photoelectric conversion units that convert light incident from the imaging optical system via the micro lenses into an electrical signal to output the information indicating the intensity of light related to the captured image and the information indicating the direction of light related to the captured image, and
    wherein the image generating unit acquires the information indicating the intensity of light related to the captured image, captured by the imaging unit, and the information indicating the direction of light related to the captured image to thereby generate the image data.

7. A control method that is executed by an image processing apparatus for generating image data in which a focus state of a captured image is specified, the method comprising:
    specifying the focus state of the image;
    acquiring information indicating an intensity of light related to a captured image and information indicating a direction of light related to the captured image;
    generating image data of which the focus state has been specified in the specifying using the information acquired in the acquiring;
    generating display data for deletion confirmation upon deletion operation of the image data; and outputting the generated image data and the generated display data, wherein, when the focus state is changed by the specification made in the specifying, an image data in a predetermined focus state differing from the changed focus state is generated in generating the image data upon deletion operation of the image data.

8. The control method according to claim 7, wherein, in generating the image, focal distance information and depth of field information are acquired as focus information specified in the specifying to thereby generate the image data.

9. The control method according to claim 7, wherein, when the focus state is changed by the specification made in the specifying, upon deletion operation of the image data, first image data generated by using focus information differing from the changed focus state and second image data generated by using focus information for a plurality of objects are output in generating the image upon the deletion operation of the image data, and display data for deletion confirmation including the generated first image data and the generated second image data is generated in generating the display data.

10. The control method according to claim 7, wherein, when the focus state is changed by the specification made in the specifying, first image data generated by using focus information differing from the changed focus state and a plurality of image data where each of which is generated by using focus information for each object are output in the image generating step upon the deletion operation of the image data, and display data for deletion confirmation including the first image data and the plurality of image data generated in generating the image data is generated in generating the display data.

11. The control method according to claim 7, further comprising:

storing a focus information set at the end of imaging or a focus information set by recognizing an object in an image in a storing unit, wherein, when a focus state differing from a focus state corresponding to focus information acquired from the storing unit is specified, image data generated by using the focus information acquired from the storing unit is output in generating the image data upon deletion operation of the image data, and display data for deletion confirmation including the image data is generated in generating the display data.

12. The control method according to claim 7, further comprising:

imaging to receive light from an object via an imaging optical system, wherein, in the imaging, light incident from the imaging optical system via a plurality of micro lenses is converted into an electrical signal with a plurality of photoelectric conversion units to output the information indicating the intensity of light related to the captured image and the information indicating the direction of light related to the captured image, and wherein, in generating the image data, the information indicating the intensity of light related to the captured image, captured in the imaging, and the information indicating the direction of light related to the captured image are acquired to thereby generate the image data.

13. A non-transitory computer-readable storage medium storing a program for causing a computer to execute the control method that is executed by an image processing apparatus for generating image data in which a focus state of a captured image is specified, the method comprising:

specifying the focus state of the image;

acquiring information indicating an intensity of light related to a captured image and information indicating a direction of light related to the captured image;

generating image data of which the focus state has been specified in the specifying using the information acquired in the acquiring;

generating display data for deletion confirmation upon deletion operation of the image data; and outputting the generated image data and the generated display data, wherein, when the focus state is changed by the specification made in the specifying, an image data in a predetermined focus state differing from the changed focus state is generated in generating the image data upon deletion operation of the image data.

14. The image processing apparatus according to claim 1, wherein the image data in a predetermined focus state generated by the image generating unit is image data of which the focus state has been specified by a user operation upon shooting.

15. The image processing apparatus according to claim 1, wherein the image data in a predetermined focus state generated by the image generating unit is image data of which the focus state is a deep-focus state.

16. The control method according to claim 7, wherein the image data in a predetermined focus state generated in generating is image data of which the focus state has been specified by a user operation upon shooting.

17. The control method according to claim 7, wherein the image data in a predetermined focus state generated in generating is image data of which the focus state is a deep-focus state.

* * * * *